United States Patent
Fujinaga (10) Patent No.: US 8,500,227 B2
(45) Date of Patent: Aug. 6, 2013

(54) PRINTING APPARATUS TO CONTROL A PRINTING UNIT

(75) Inventor: Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 12/964,006

(22) Filed: Dec. 9, 2010

(65) Prior Publication Data

US 2011/0210995 A1    Sep. 1, 2011

(30) Foreign Application Priority Data

Feb. 26, 2010    (JP) .................................. 2010-042335

(51) Int. Cl.
*B41J 29/38* (2006.01)

(52) U.S. Cl.
USPC ............................................................. 347/9

(58) Field of Classification Search
None
See application file for complete search history.

(56) References Cited

U.S. PATENT DOCUMENTS

| 4,223,324 | A  | * | 9/1980 | Yamamori et al. | 347/21 |
| 2006/0100724 | A1 | * | 5/2006 | Miura et al. | 700/82 |
| 2007/0092280 | A1 | * | 4/2007 | Nakazato et al. | 399/75 |
| 2010/0215391 | A1 | * | 8/2010 | Namiki et al. | 399/70 |

FOREIGN PATENT DOCUMENTS

| JP | 2001-058398 A | 3/2001 |
| JP | 2001-129985 A | 5/2001 |
| JP | 2006-254030 A | 9/2006 |
| JP | 2007-191701 A | 8/2007 |
| JP | 2007-201605 A | 8/2007 |

* cited by examiner

*Primary Examiner* — Geoffrey Mruk
*Assistant Examiner* — Bradley Thies
(74) *Attorney, Agent, or Firm* — Canon USA, Inc., IP Division (57) ABSTRACT

A setting unit that can set the start time when a user starts using a apparatus and a control unit that can make the apparatus enter a non-operation state in either first standby mode or second standby mode where the apparatus can be actuated from the non-operation state in a shorter time than in the first standby mode are provided. The control unit performs control to determine to which of the first standby mode and the second standby mode when the apparatus enters the non-operation state, based on the time difference between a time when an instruction to turn off the apparatus is issued and the start time set with the setting unit.

12 Claims, 9 Drawing Sheets

PRINTING APPARATUS TO CONTROL A PRINTING UNIT

BACKGROUND OF THE INVENTION

1. Field of the Invention

The present invention relates to a printing apparatus configured to print image data onto a sheet and a method of controlling the start of the printing apparatus.

2. Description of the Related Art

A printing apparatus disclosed in Japanese Patent Laid-Open No. 2006-254030 is configured to control whether or not standby processing should be performed immediately after the main power is turned on based on the time when the main power is turned off.

SUMMARY OF THE INVENTION

A printing apparatus according to an embodiment of the present invention includes a printing unit, a setting unit, and a control unit. The printing unit performs printing and the setting unit sets a start time that represents when a user starts using the apparatus. The control unit performs control so that the apparatus is made to enter a non-operation state in at least one of a first standby mode and a second standby mode. The time it takes to actuate the apparatus from the non-operation state in the second standby mode is shorter than the time it takes to actuate the apparatus from the non-operation state in the first standby mode. The control unit determines whether the apparatus is to enter the non-operation state in the first standby mode or the non-operation state in the second standby mode based on a time difference between a time when an instruction to turn off the apparatus is issued and the start time set by the setting unit.

Further features of the present invention will become apparent from the following description of exemplary embodiments with reference to the attached drawings.

DESCRIPTION OF THE EMBODIMENTS

After being started, a large-sized printing apparatus has often taken an actuation time (waiting time) of several tens of minutes to several hours for initialization until the internal state of the printing apparatus is so stabilized that printing can be started. The above-described printing apparatus should be provided with a mechanism allowing a user to start using the printing apparatus without waiting a long time. Accordingly, the present invention provides the above-described mechanism for putting the printing apparatus to practical use.

If the difference between the time when the printing apparatus is made to enter the non-operation state (off state) and the time when the printing apparatus is started is shorter than an actuation time (several tens of minutes to several hours) taken for initializing the printing apparatus, the initialization is not finished before the start time and the user may have to wait for the initialization. That is, the user spends his/her time idly without knowing how much longer he/she has to wait. The above-described problems should be solved to put the printing apparatus to practical use.

Further, for not making the user wait a long time, the printing apparatus should be automatically actuated before the start time when the user starts using the printing apparatus, and the internal state of the printing apparatus should be stable at the start time. However, the actuation time is changed due to the installation environment, the start process, and so forth of the printing apparatus. That is, the actuation time is not always constant. The actuation time varies so greatly that the actuation time falls within the range of from several tens of minutes to several hours. If the printing apparatus is actuated before the start time when the user starts using the printing apparatus in expectation of the maximum actuation time, for example, the user can use the printing apparatus without waiting. However, when the printing apparatus is actuated earlier than the start time, the idle time is increased, which is not desirable from the viewpoint of energy conservation. When the printing apparatus is automatically actuated earlier than the start time by as much as a time shorter than the maximum actuation time, for example, an average actuation time, the average idle time is decreased. However, when the actuation time is longer than a set time, the user has to wait by as much as the time difference between the actuation time and the set time. Therefore, the printing apparatus should be actuated earlier than the start time based on the varying actuation time in some way to put the printing apparatus to practical use.

The present invention provides a convenient printing apparatus, where a user can start using the printing apparatus without waiting a long time.

First Embodiment

Hereinafter, a printing apparatus achieved with an inkjet system according to an embodiment of the present invention will be described. The above-described printing apparatus is a high-speed line printer that uses a long and continuous sheet (a continuous sheet longer than the length of the unit of printing performed repeatedly in the convey direction (each unit of printing performed repeatedly in the convey direction referred to as a single page, a single unit image, and/or a unit image)) and that is appropriate for both the simplex printing and the duplex printing. The above-described printing apparatus is appropriate for the field of printing a large number of images in a print lab or the like, for example. According to this specification, even though a mixture of small images, characters, blank spaces, and so force is shown in the region of a single print unit (a single page), the mixture shown in the above-described region is collectively referred to as a single unit image. That is, the unit image denotes a single print unit (a single page) used when at least two pages are printed on a continuous sheet in sequence. The length of the unit image varies based on the size of an image for printing. When printing an L-size photograph, for example, the length of the photograph, which is measured along the sheet-conveyance direction, is 135 mm. Further, when printing an A4-size photograph, the length of the photograph, which is measured along the sheet-conveyance direction, is 297 mm.

The present invention can be used for a printing apparatus including a printer, a printer-multifunction device, a copier, a facsimile, and so forth. Printing processing may be performed with the use of any of the inkjet system, the electrophotographic system, the thermal-transfer system, the dot-impact system, the liquid-development system, and so forth. Further, without being limited to the printing apparatus, the present invention can also be used for various apparatuses and/or devices including an industrial machine (for example, an apparatus and/or a device provided to manufacture and/or test various types of devices) used in a factory or the like, where the operation time of the various apparatuses and/or devices is specified through a user, and it takes a long time for performing an initialization operation to actuate the various apparatuses and/or devices.

Figure 1:
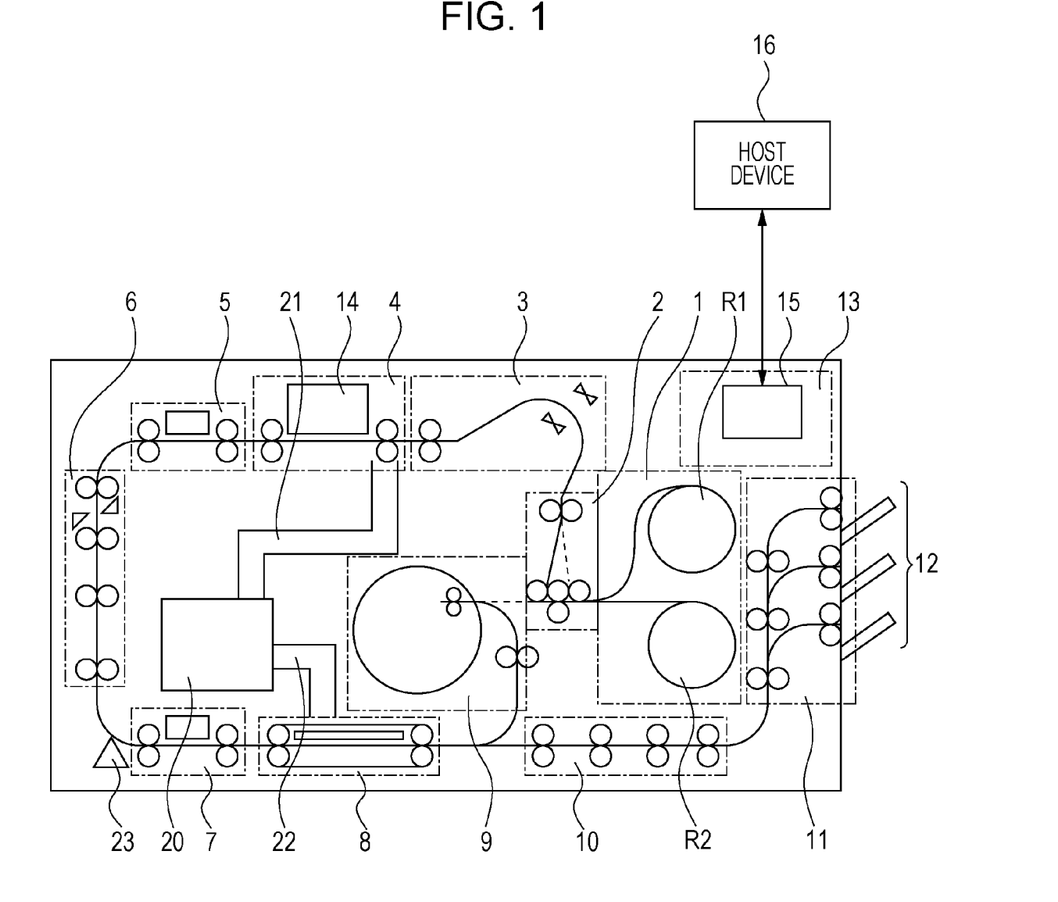
FIG. 1 is a schematic diagram illustrating the internal configuration of a printing apparatus.

FIG. 1 is a schematic section view of the internal configuration of a printing apparatus. The printing apparatus of the present embodiment allows for performing duplex printing through the use of a sheet wound into a roll so that data is printed on first and second surfaces of the sheet, where the first surface is the front face and the second surface is the back face of the first surface. The printing apparatus roughly includes a sheet feeding 1, a decurling unit 2, a skew-correcting unit 3, a printing unit 4, a testing unit 5, a cutter unit 6, an information-recording unit 7, a drying unit 8, an reverse unit 9, a discharge conveying unit 10, a sorting unit 11, a discharging unit 12, a humidifying unit 20, and a control unit 13. The sheet is conveyed through a conveying mechanism including a couple of rollers, a belt, and so forth along a sheet-conveyance path indicated by a solid line illustrated in FIG. 1, and is subjected to processing performed through each of the above-described units. The sheet is conveyed downstream along the sheet conveyance path while printing. At an arbitrary position in the sheet conveyance path where the sheet is conveyed from feeding means to discharging means, a side toward the feeding means is referred to as "the upstream side", and the opposite side toward the ejecting means is referred to as "the downstream side".

The sheet feeding 1 is provided to retain and feed a continuous sheet wound into a roll. The sheet feeding 1 can accommodate two rolls R1 and R2 so that the sheet is alternatively drawn out for feeding. Further, the number of rolls that can be accommodated in the sheet feeding 1 may not be limited to two. That is, a single roll and/or three or more rolls of the sheet may be accommodated in the sheet feeding 1. Further, so long as the sheet is continuous, the sheet may not be wound into a roll. For example, a continuous sheet perforated for every unit length may be folded over for each perforation, and the folded portions of the sheet may be stacked on one another and accommodated in the sheet feeding 1.

The decurling unit 2 is provided to reduce the curl (curvature) of the sheet fed from the sheet feeding 1. The decurling unit 2 bends the sheet so that the sheet is bent oppositely to the curl so that the sheet is made to pass through the use of two pinch rollers that are provided for a single driving roller. Consequently, the curl of the sheet is reduced under the action of decurling force.

The skew-correcting unit 3 is provided to correct a skew (an inclination relative to the original travel direction) of the sheet that had passed the decurling unit 2. An end of the sheet, the end being defined on the reference side of the sheet, is pressed against a guiding member so that the skew of the sheet is corrected.

The printing unit 4 is provided to perform print processing for the sheet being conveyed from on high through a print head 14 so that an image is formed on the sheet. The printing unit 4 includes a plurality of conveying rollers provided to convey sheets. The print head 14 includes a line-shaped print head including an array of inkjet-type nozzles, where the inkjet-type nozzle array covers the maximum width of a sheet which is expected to be used. The print head 14 includes a plurality of print heads that are arranged in parallel with one another along the conveyance direction. In the present embodiment, the print head 14 includes seven print heads that are provided for seven colors including cyan (C), magenta (M), yellow (Y), light cyan (LC), light magenta (LM), gray (G), and black (K). Further, the number of each of the colors and the print heads is not limited to seven. The inkjet system may include a system including a heating element, a system including a piezoelectric element, a system including an electrostatic element, a system including a micro-electro-mechanical-systems (MEMS) element, and so forth. Ink of each of the colors is transmitted from an ink tank to the print head 14 via an ink tube.

The testing unit 5 is provided to optically read the data of a testing pattern and/or an image printed on the sheet by the printing unit 4 through the use of a scanner, test the state of the nozzles of the print head, the sheet-conveyance state, the image location, and so forth, and determine whether or not the image data is correctly printed. The scanner includes a charge-coupled-device (CCD) image sensor and/or a complementary-metal-oxide-semiconductor (CMOS) image sensor.

The cutter unit 6 includes a mechanical cutter provided to cut the printed sheet into specified lengths. The cutter unit 6 includes a plurality of conveying rollers that are provided to pass the sheet to the next procedure.

The information-recording unit 7 is provided to record print information (unique information) including information about the serial number, the date, and so forth of printing on a non-print area of the cut sheet. The print-information recording is achieved by printing the data of a character and/or code on the sheet through the inkjet system, the thermal-transfer system, and so forth. A sensor 23 configured to detect the front-end edge of the cut sheet is provided upstream from the information-recording unit 7 and downstream from the cutter unit 6. That is, the sensor 23 detects an end of the sheet between the cutter unit 6 and a recording position determined with the information-recording unit 7. The time when the information-recording unit 7 records the information is controlled based on the time when the sensor 23 detects the sheet end.

The drying unit 8 is provided to heat the sheet printed with the printing unit 4 and to dry applied ink in a short time. A hot wind is applied to the sheet passing through the drying unit 8 from the under-face side, at least, to dry the ink-applied face of the sheet. Without being limited to the hot-wind application system, the drying system may be a system provided to irradiate the sheet face with an electromagnetic wave (ultraviolet ray, an infrared ray, and so forth).

The above-described sheet-conveyance path extending from the sheet feeding 1 to the drying unit 8 is referred to as a first path. The first path is provided to make a U-turn between the printing unit 4 and the drying unit 8. The cutter unit 6 is provided in the middle of the U-turn.

The reverse unit 9 is provided to temporarily wind up the continuous sheet that had already been subjected to the face printing and invert the sheet from the front to the back, and vice versa at the duplex printing time. The reverse unit 9 is provided in the middle of a path (loop path) extending from the drying unit 8 to the printing unit 4 via the decurling unit 2 (referred to as a second path), where the second path is provided to feed the sheet that had passed the drying unit 8 to the printing unit 4 again. The reverse unit 9 includes a winding-rotation member (drum) rotated to wind up the sheet. The continuous sheet that had already been subjected to the surface printing and that had not been cut is temporarily wound around the winding rotation member. When the winding is finished, the winding-rotation member is counterrotated so that the wounded sheet is fed to the decurling unit 2 and transmitted to the printing unit 4. Since the sheet is inverted from the front to the back, the printing unit 4 can perform the printing for the back face of the sheet. The operations of the duplex printing will be described later in more detail.

The discharge conveying unit 10 is provided to convey the sheet that is cut with the cutter unit 6 and that is dried with the drying unit 8, and transfer the sheet to the sorting unit 11. The discharge conveying unit 10 is provided in a path different from the second path where the reverse unit 9 is provided (referred to as a third path). A path-changing mechanism including a movable flapper is provided at the place where the path is branched off, so as to selectively guide the sheet conveyed from the first path to either the second path or the third path.

The sorting unit 11 and the discharging unit 12 are provided on a side part of the sheet feeding 1 and the end of the third path. The sorting unit 11 is provided to sort the printed sheets for each group, as appropriate. The sorted sheets are discharged to the discharging unit 12 including a plurality of trays. Thus, according to the above-described layout, the third path passes beneath the sheet feeding 1 so that the sheet feeding 1 is sandwiched between the third path, and the printing unit 4 and/or the drying unit 8. Consequently, the sheet is discharged opposite to the printing unit 4 and/or the drying unit 8.

The humidifying unit 20 is provided to generate and supply a humidified gas (air) to clearance generated between the print head 14 of the printing unit 4 and the sheet. Consequently, the ink of the nozzles of the print head 14 is prevented from being dried. The humidification system of the humidifying unit 20 includes a vaporization system, a water-spray system, a steam system, and so forth. The vaporization system includes a permeable-film system, a drop-filtration system, a capillary-tube system, and so forth in addition to a rotation system used in the present embodiment. The water-spray system includes an ultrasonic system, a centrifugal system, a high-pressure spray system, a two-fluid spray system, and so forth.

The steam system includes a steam-piping system, an electric-heating system, an electrode system, and so forth. The humidifying unit 20 is connected to the printing unit 4 through a first duct 21. The humidifying unit 20 is further connected to the drying unit 8 through a second duct 22. The drying unit 8 generates a humid and hot gas at the sheet-drying time. The gas is guided into the humidifying unit 20 via the second duct 22 and is used as auxiliary energy to generate the humidified gas in the humidifying unit 20. Then, the humidified gas generated with the humidifying unit 20 is guided into the printing unit 4 via the first duct 21.

The control unit 13 is provided to control each of the units of the entire printing apparatus. The control unit 13 includes a central-processing unit (CPU), storage, a controller (control unit) including various types of control units, an external interface, and an operation unit 15 to and/or from which the user transmits and/or externally transmits data. The operation of the printing apparatus is controlled based on an instruction transmitted from a host device 16 including a controller and/or a host computer connected to the controller via an external interface, for example.

Figure 2:
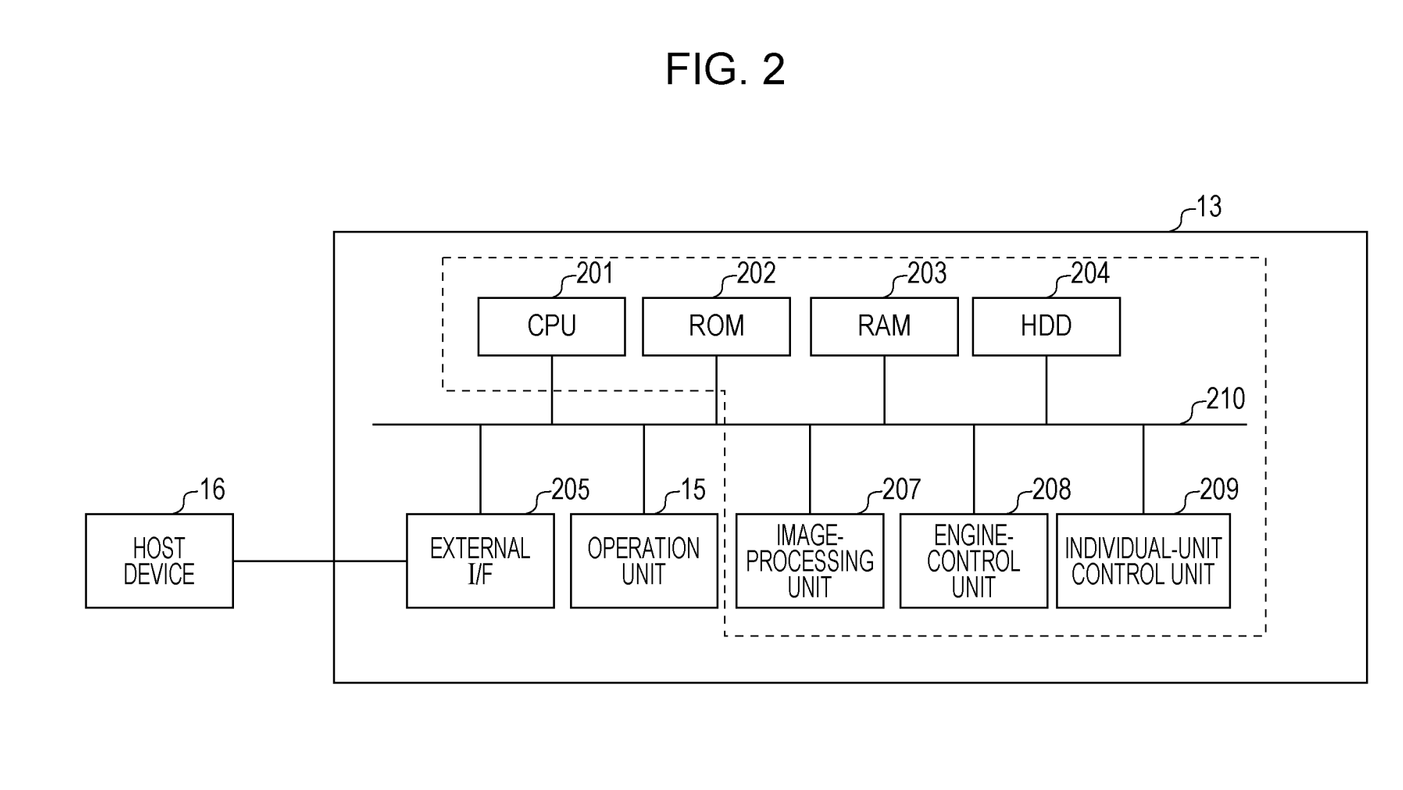
FIG. 2 is a block diagram of a control unit.

FIG. 2 is a block diagram illustrating the concept of the control unit 13. The controller included in the control unit 13 (the area enclosed with a broken line) includes a CPU 201, a read-only memory (ROM) 202, a random-access memory (RAM) 203, a hard disk drive (HDD) 204, an image-processing unit 207, an engine-control unit 208, and an individual-unit control unit 209. The CPU 201 integratively controls the operation of each of the units of the printing apparatus. The ROM 202 stores programs that are executed with the CPU 201 and/or fixed data used by the printing apparatus performing various operations. The RAM 203 is used as, for example, the work area of the CPU 201 and an area used to temporarily store various types of reception data, and is used to store various types of setting data.

The HDD 204 can store and/or read a program executed with the CPU 201, print data, the setting information used by the printing apparatus performing the various types of operations. The operation unit 15 is an input-and-output interface provided between the printing apparatus and the user, and includes an input unit having hardware keys and/or a touch panel, and an output unit including a display provided to show information, a voice generator, and so forth. For example, the operation unit 15 includes a display provided with a touch panel to show the operation status, the printing conditions, the maintenance information (the remaining quantity of ink and sheet, the maintenance status, etc.), and so forth of the printing apparatus to the user. The user can transmit various types of information to the printing apparatus with the touch panel.

A unit provided to perform data processing with high speed includes a purpose-built processing section. The image-processing unit 207 performs image processing for print data handled by the printing apparatus. The color space (e.g., YCbCr) of transmitted image data is converted into ordinary RGB-color space (e.g., sRGB). Further, the image data is subjected to various types of image processing including the resolution conversion, the image analysis, the image correction, and so forth. Print data obtained with the above-described image processing is stored in the RAM 203 and/or the HDD 204. The engine-control unit 208 controls the driving of the print head 14 of the printing unit 4 in accordance with the print data based on a control command transmitted from the CPU 201 or the like. The engine-control unit 208 further controls the conveyance mechanism of each of the units of the printing apparatus.

The individual-unit control unit 209 is a sub-controller provided to control each of the units including the sheet feeding 1, the decurling unit 2, the skew-correcting unit 3, the testing unit 5, the cutter unit 6, the information-recording unit 7, the drying unit 8, the reverse unit 9, the discharge conveying unit 10, the sorting unit 11, the discharging unit 12, and the humidifying unit 20. The individual-unit control unit 209 controls the operation of each of the units based on an instruction issued from the CPU 201. The external interface 205 is an interface (I/F) which is a local I/F and/or a network I/F provided to connect the controller to the host device 16. The above-described components are connected to one another via a system bus 210.

The host device 16 is provided as the supplying source of image data to make the printing apparatus perform printing. The host device 16 may be a general-purpose computer and/or a purpose-built computer. Otherwise, the host device 16 may be a purpose-built image device including an image capture having an image-reading unit, a digital camera, photo storage, and so forth. When the host device 16 is a computer, an operation system (OS), application software generating image data, and a printer driver provided for the printing apparatus are installed in storage included in the computer.

Each of the processing procedures may not be achieved with software. That is, part of and/or all of the processing procedures may be achieved with hardware.

Next, the basic operation performed at the printing time will be described. Since operations that are performed in simplex printing mode are different from those performed in duplex printing mode, the operations will be described for each of the simplex printing mode and the duplex printing mode.

Figure 3:
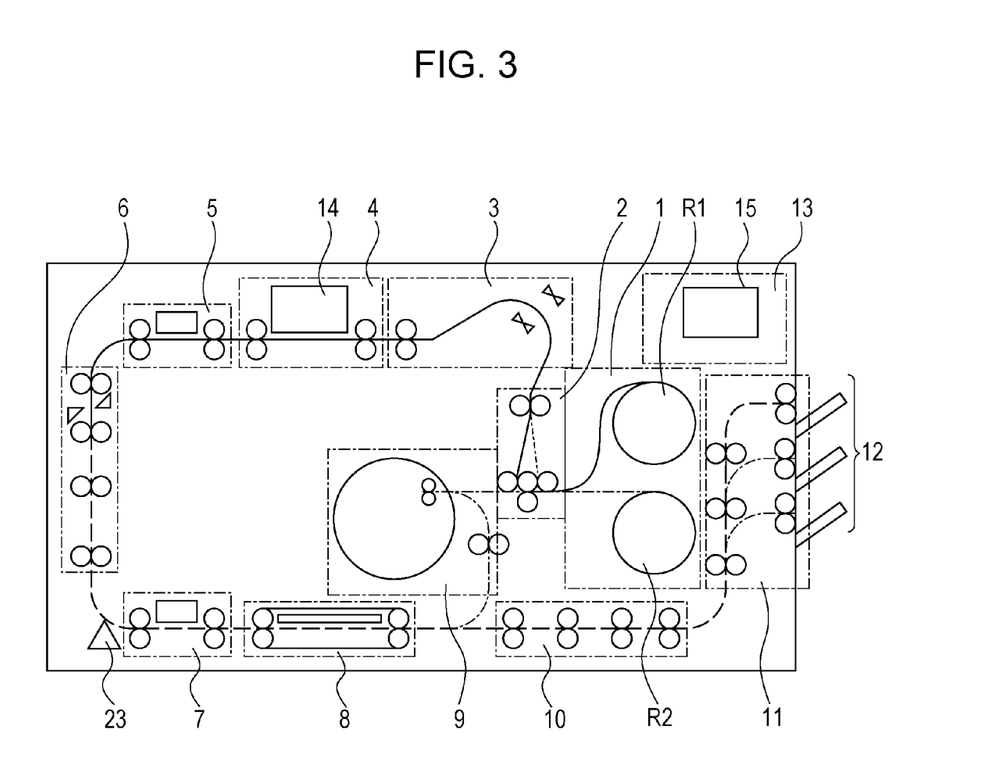
FIG. 3 illustrates operations that are performed in simplex printing mode.

FIG. 3 illustrates the operations that are performed in the simplex printing mode. A conveyance path extending from the sheet feeding 1 to the discharging unit 12, where the sheet fed from the sheet feeding 1 is printed and discharged from the discharging unit 12, is indicated by thick lines. The printing unit 4 prints data on the front face (first surface) of the sheet that is fed from the sheet feeding 1 and that is processed in each of the decurling unit 2 and the skew-correcting unit 3. Images having a specified unit length defined along the conveyance direction (unit images) are printed on the long continuous sheet in sequence so that the unit images are formed and arranged on the long continuous sheet.

The printed sheet is cut into the unit images with the cutter unit 6 via the testing unit 5. Print information is recorded onto the back face of each of the cut sheets with the information-recording unit 7 as appropriate. Then, the cut sheets are conveyed to the drying unit 8 for drying on a one-by-one basis. After that, the cut sheets are sequentially discharged to the discharging unit 12 of the sorting unit 11 via the discharge conveying unit 10, and are stacked on one another. On the other hand, the sheet which is left on the printing-unit-4 side at the time when the last unit image is cut is returned to the sheet feeding 1, and the sheet is wound around the roll R1 and/or the roll R2. Thus, the sheet passes through the first and third paths for processing, but does not pass through the second path in the simplex printing mode.

Figure 4:
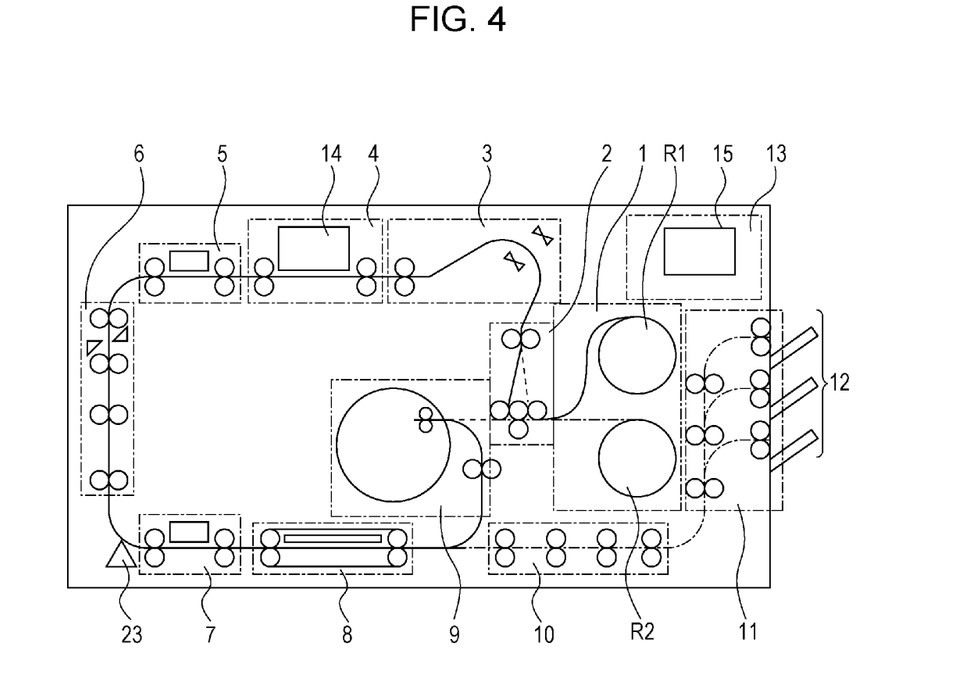
FIG. 4 illustrates operations that are performed in duplex printing mode.

FIG. 4 is a diagram illustrating the operations that are performed in the duplex printing mode. In the duplex printing mode, a back-face (second surface) printing sequence is performed subsequent to a front-face (first surface) printing sequence. In the first front-face printing sequence, the operations that are performed with the units including the sheet feeding 1 to the testing unit 5 are the same as those performed for the above-described simplex printing. The cutter unit 6 does not perform the cutting operation so that the continuous sheet is conveyed to the drying unit 8, as it is. After the ink applied to the front face is dried with the drying unit 8, the sheet is guided not to a path provided on the discharge conveying-unit-10 side (the third path), but into a path provided on the reverse-unit-9 side (the second path).

On the second path, the sheet is wound around the winding rotary member of the reverse unit 9 rotated in a forward direction (the counterclockwise direction in FIG. 4). When the expected front-face printing is entirely finished in the printing unit 4, the rear end of the print area of the continuous sheet is cut with the cutter unit 6. With reference to the cut position, the continuous sheet corresponding to the conveyance direction-downstream side (the printed side) is entirely wound up to the rear end (cut position) of the sheet with the reverse unit 9 via the drying unit 8. On the other hand, at the same time as when the above-described winding is performed, the continuous sheet left on the conveyance direction-upstream side which is defined with reference to the cut position (the printing-unit-4 side) is wound back to the sheet feeding 1 so that the leading end of the continuous sheet (cut position) is not left in the decurling unit 2, and the continuous sheet is wound around the roll R1 and/or the roll R2. The above-described rewinding allows for reducing a collision of the above-described wound sheet with the sheet which is fed again in the following back-face printing sequence.

After the above-described front-face printing sequence is performed, the operation is changed into the back-face printing sequence. The winding rotary member of the reverse unit 9 is rotated in a direction opposite to that in which the winding rotary member is rotated in the winding time (the clockwise direction in FIG. 4). An end of the wound sheet (the rear end of the wound sheet becomes the front end when the sheet is sent forth) is transmitted to the decurling unit 2 along a path indicated by a broken line. In the decurling unit 2, the curl of the sheet, which is caused by the winding rotary member, is corrected. That is, on the first path, the decurling unit 2 is provided between the sheet feeding 1 and the printing unit 4. Further, on the second path, the decurling unit 2 is provided between the reverse unit 9 and the printing unit 4. That is, the decurling unit 2 functions as a common unit provided to decurl the sheet on each of the first and second paths.

The sheet inverted from the front to the back is conveyed to the printing unit 4 via the skew-correcting unit 3, and data is printed on the back face of the sheet. The printed sheet is cut into specified unit lengths with the cutter unit 6 via the testing unit 5, where the specified unit length is set in advance. Since the data printing is performed for both sides of each of the cut sheets, the information-processing unit 7 records no information on the cut sheet. Then, the cut sheets are conveyed to the drying unit 8 on a one-by-one basis. After that, the cut sheets are sequentially discharged to the discharging unit 12 of the sorting unit 11 via the discharge conveying unit 10, and are stacked on one another. Thus, when performing the duplex printing, the sheet passes through the first path, the second path, the first path, and the third path in that order for processing.

Next, an actuation-control method used to actuate (on) and/or stop (off) the above-described printing apparatus will be described in more detail. The actuation control is performed based mainly on an instruction issued from the control unit 13.

According to the printing apparatus, the user can separately set two times including the start time when the user starts using the printing apparatus and the stop time when the user stops operating the printing apparatus (the time when an instruction to turn off the printing apparatus is issued) with the operation unit 15.

Figure 5:
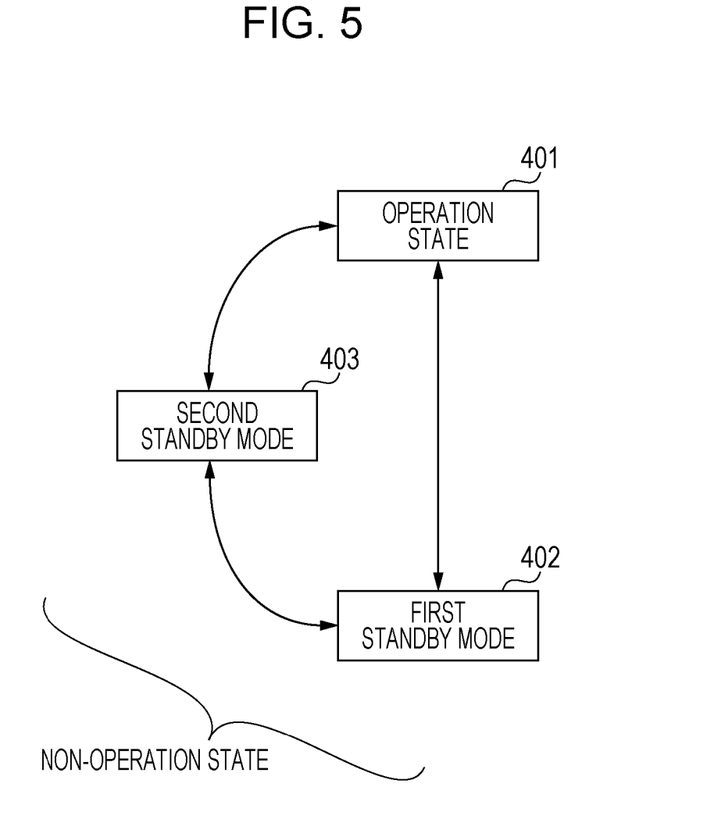
FIG. 5 illustrates the transition between a non-operation state (standby state) and an operation state.

FIG. 5 illustrates the transition between the non-operation state (standby state) and the operation state of the printing apparatus. The state of the printing apparatus is divided into an operation state 401 where the printing apparatus is operating, first standby mode 402 which is the state where the printing apparatus is not operating (a standby state and/or an off state), and second standby mode 403. The printing apparatus is fully actuated in the operation state 401 so that the printing operations or the like can be performed in the operation state 401. In the first standby mode 402, the printing apparatus is in a deep-sleep state and the entire printing apparatus is shut down except that part (e.g., the CPU) of the control unit 13 is energized. When an instruction to actuate the printing apparatus is issued in the first standby mode 402, it takes a time of from several tens of minutes to several hours until the state of the printing apparatus is shifted to the operation state 401.

On the other hand, it takes a time of from several minutes to several tens of minutes according to the circumstances until the printing apparatus is shifted from the operation state 401 to the first standby mode 402. The second standby mode 403 is a sleep state lighter than the first standby mode. Many of the units are energized in the second standby mode 403 so that the power supply is turned off only for units including the testing unit 5, the reverse unit 9, the discharge conveying unit 10, and so forth that can be actuated in a short time. When the actuation instruction is issued in the second standby mode 403, the printing apparatus can be shifted to the operation state 401 in a shorter time (e.g., several minutes) than that of the first standby mode 402. On the contrary, when the printing apparatus is shifted from the operation state 401 to the second standby mode 403, it also takes a short time (e.g., several minutes) to make a shift. The state transition can also be achieved between the first standby mode 402 and the second standby mode 403. For example, when the second standby mode lasts a long time, the printing apparatus is automatically shifted to the first standby mode. The printing apparatus may have three or more standby modes with different sleep depths (different times that are taken until the printing apparatus returns from the sleep state).

The printing apparatus includes an estimation unit (the control unit 13) provided to acquire an estimated time by estimating a time taken for performing an initialization operation at the printing-device starting time, that is, an initialization operation performed to shift the printing apparatus from the first standby mode 402 to the operation state 401. Further, the estimation unit acquires different estimated time by estimating a time taken for performing a simple initialization operation performed to shift the printing apparatus from the second standby mode 403 to the operation state 401.

The following processing procedures are executed to achieve the initialization operation performed to shift the printing apparatus from the first standby mode 402 to the operation state 401. When the power is turned on, a heater included in each of the drying unit 8 and the humidifying unit 20 starts the heat application. The printing apparatus waits until the state where the drying unit 8 stably generates a gas with a predetermined temperature and the humidifying unit 20 stably generates a humidified gas with a predetermined temperature and a predetermined humidity (the steady state) is achieved. The other units that are included in the printing apparatus are also initialized in parallel with the above-described initialization operation. After the drying unit 8 and the humidifying unit 20 enter the steady state, the printing unit 4 is subjected to adjustment processing. The adjustment processing includes the elimination of nozzle clogging (the preliminary ejection and/or suction of ink), the resist adjustment, and so forth. Among others, it takes much time to achieve the resist adjustment.

According to the resist adjustment, the printing unit 4 forms a test pattern on the sheet, and the testing unit 5 reads the test pattern, performs tests to determine whether or not each of the nozzles of the print head 14 operates properly, and adjusts each of the nozzles so that each of the nozzles operates properly. After the adjustment of the printing unit 4 is finished, a series of the initialization operations is finished so that ordinary printing can be started. The entire time taken for performing the initialization operations is determined based mainly on the stabilization of the drying unit 8 and the humidifying unit 20, and the adjustment of the printing unit 4, the adjustment being performed subsequent to the stabilization. Therefore, the time taken for the stabilization and that taken for the adjustment may be separately estimated, and the sum total of the stabilization time and the adjustment time may be determined to be the estimated time.

The time taken until the drying unit 8 and the humidifying unit 20 enter the steady state is changed based on the temperature and the humidity of each of the units, the heater temperature, and the outside air temperature of a place where the printing apparatus is provided, which are measured at power-on. The estimation unit (the control unit 13) reads the current value of a temperature-measuring device and/or a humidity-measuring device provided in each of the units. Then, a time taken for reading data of tabled values that are obtained through calculations and/or tabled values that had been obtained empirically from a memory, and waiting until the steady state is achieved is obtained based on the read current values and a non-operation time until the next actuation of the printing apparatus. The non-operation time can be acquired based on the difference between the two times including the start time and the time when the operation of the printing apparatus is finished, where data of the two times is transmitted from the user with the operation unit 15. If the stabilization time of the drying unit 8 is longer than that of the humidifying unit 20, and vice versa, the longer stabilization time is stored as a first estimated time.

The time taken for adjusting the printing unit 4 varies based on the non-operation time of the printing apparatus. Therefore, the estimation unit (the control unit 13) reads data of tabled values that are obtained through calculations and/or tabled values that had been obtained empirically based on the non-operation time from a memory, calculates a time taken for performing the resist adjustment, and determines the calculated time to be a second estimated time. Then, the estimation unit determines the sum total of the first and second estimated times to be an estimated time taken for performing the initialization operation of the printing apparatus.

In the second standby mode 403, each of the drying unit 8 and the humidifying unit 20 is heated during the sleep state. Therefore, after the sleep state is cancelled, the drying unit 8 and the humidifying unit 20 enter the steady state in a short period of time. Therefore, the time taken for performing the adjustment (the resist adjustment in particular) of the printing unit 4 takes up most of the time taken for performing the simple initialization operation performed to shift the printing apparatus from the second standby mode 403 to the operation state 401. Therefore, the estimation unit may estimate the time taken for adjusting the printing unit 4 and determine the estimated time to be the general estimated time. In any case, the estimated time may be obtained by adding a little margin time to a time estimated to be appropriate for actually performing the initialization operation in expectation of an estimation error.

Figure 6:
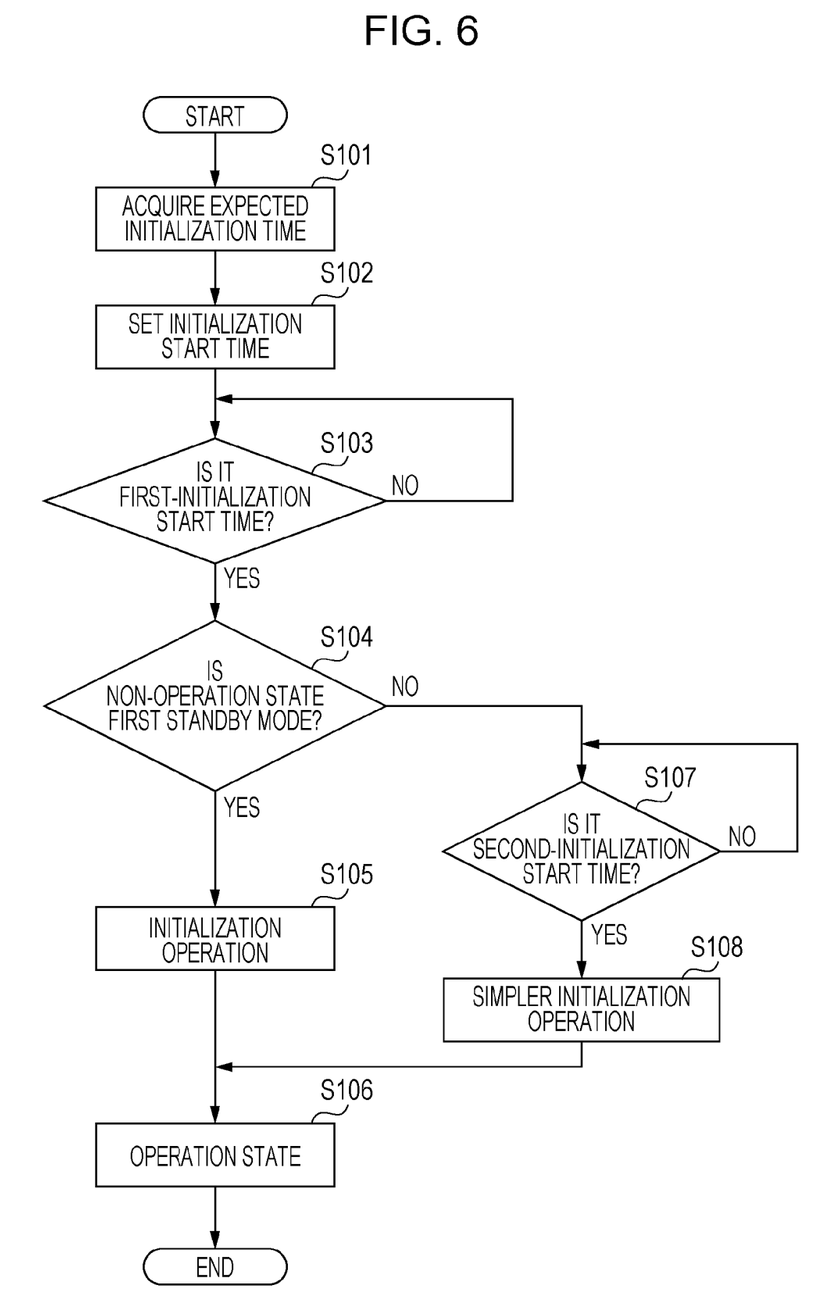
FIG. 6 is a flowchart illustrating a start sequence performed for the printing apparatus.

FIG. 6 is a flowchart illustrating an actuation sequence (power-on control) performed to shift the printing apparatus from the non-operation state to the operation state. The above-described actuation sequence is performed with the control unit of which part is energized even though the printing apparatus is in the standby mode.

At step S101, the estimation unit estimates the time taken for performing each of the initialization operation (step S105 which will be described later) and the simple initialization operation (step S108 which will be described later), and acquires the estimated times. Here, the estimated time is obtained by adding a little margin time to a time estimated to be appropriate for actually performing the initialization operation in expectation of an estimation error.

At step S102, an initialization-start time when the printing apparatus in the non-operation state starts performing the initialization operation is set so that the printing apparatus enters the operation state at a start time that is set in advance. Two times including a first initialization-start time when the actuation of the printing apparatus is started in the first standby mode 402 and a second initialization-start time when the actuation of the printing apparatus is started in the second standby mode 403 are set. The initialization-start time is a time predating the start time by as much as the estimated time.

The initialization operation is started at the time predating the start time by as much as the estimated time so that the printing apparatus enters the operation state at the start time.

At step S103, the printing apparatus waits until a clock provided in the printing apparatus indicates the first initialization-start time set at step S102. At step S104, the processing is branched off based on whether or not the standby mode of the printing apparatus being in the non-operation state is the first standby mode (the second standby mode). When the answer is YES at step S104 (the first standby mode), the processing advances to step S105, and when the answer is NO at step S104 (the second standby mode), the processing advances to step S107. At step S105, the initialization operations are performed for each of the units of the entire printing apparatus to return from the first standby mode.

The initialization operations are performed after the printing apparatus is actuated and until when the printing apparatus is started to when the internal state of the started printing apparatus becomes so stable that printing can be started. The initialization operations include, for example, an operation performed to clean the print head 14, an operation performed to heat the drying unit 8, an operation performed to humidify the humidifying unit 20, an air-conditioning operation performed to achieve a specified state of the atmosphere (the temperature and/or the humidity) inside the printing apparatus, and other various initialization operations that are performed until the printing apparatus becomes stable. An actuation time of several tens of minutes to several hours is taken for performing the initialization operations. At step S107, the printing apparatus waits until the second initialization start time set at step S102. At step S108, a simpler initialization operation than that of the first standby mode is performed to return from the second standby mode.

When the initialization operation is finished at step S105 and/or step S108, the processing advances to step S106 and the printing apparatus enters the operation state at the set start time. Thus, the sequence is finished.

As described above, the control unit 13 performs control so that the printing apparatus is automatically actuated at a time earlier than the start time based on the start time set with a setting unit and the estimated time estimated with the estimation unit. Therefore, the printing apparatus enters the operation state at the start time, which makes it possible for the user to start using the printing apparatus without waiting a long time.

Figure 7:
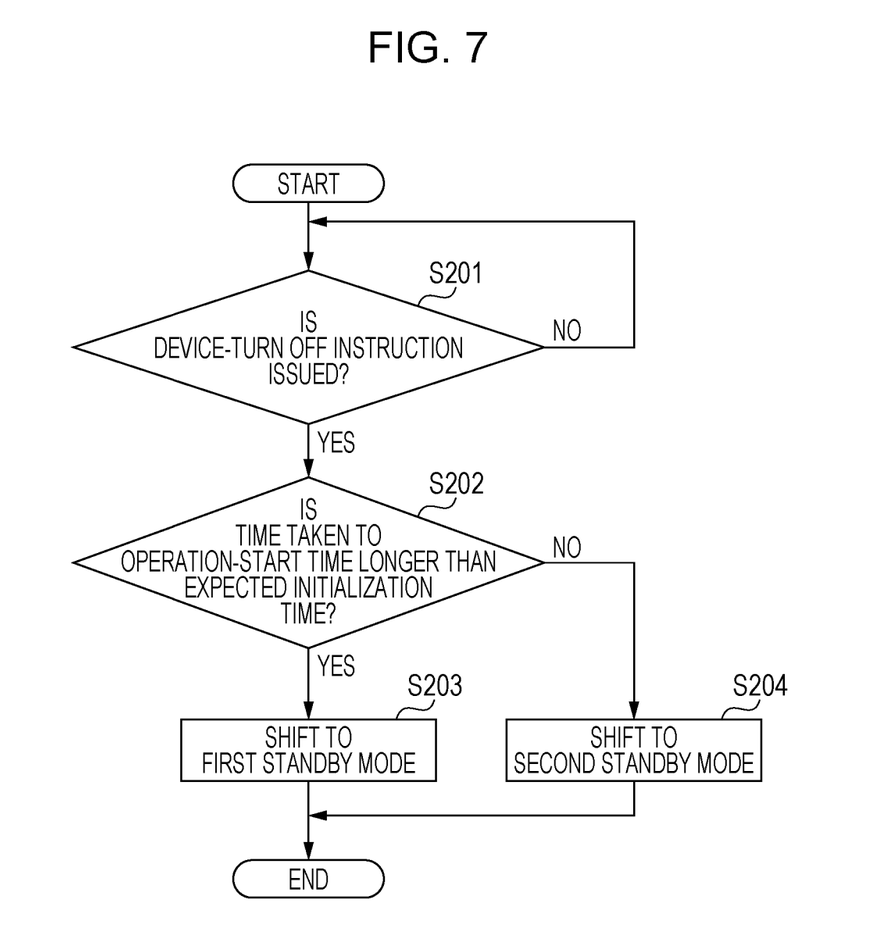
FIG. 7 is a flowchart illustrating a shift sequence performed to shift the printing apparatus to the non-operation state.

FIG. 7 is a flowchart illustrating a shift sequence (device-off control) performed to shift the printing apparatus from the operation state to the non-operation state. At step S201, the printing apparatus waits until an instruction to turn off the printing apparatus is issued during operation of the printing apparatus. The instruction to turn off the printing apparatus is automatically issued at an operation-finish time (the time of the instruction to turn off the printing apparatus) set with the setting unit in advance. Otherwise, a user who wishes to turn off the printing apparatus manually turns off the power with the operation unit 15 so that the instruction to turn off the printing apparatus is issued at the time of the instruction to turn off the printing apparatus, which is set at arbitrary time.

At step S202, the difference between the time of the instruction to turn off the printing apparatus and the start time when the user starts using the printing apparatus next time, the start time being set in advance with the setting unit, is calculated and obtained. Then, it is determined whether or not the obtained time difference (indicating the non-operation time of the printing apparatus) is longer than a specified time. That is, when the obtained time difference is longer than the specified time, the answer is YES at step S202. Otherwise, the answer is NO at step S202. The specified time is a time set based on the time taken for performing the initialization operations at the device-actuation time. More specifically, a time estimated to be taken for initializing the printing apparatus (the processing corresponding to step S105) when the printing apparatus returns from the first standby mode 402, the time being obtained with the estimation unit, is determined to be the specified time. Further, the specified time may be a constant and fixed time obtained empirically based on the time taken for performing the initialization operations. When the answer is YES at step S202, the processing advances to step S203, and when the answer is NO at step S202, the processing advances to step S204. The printing apparatus is shifted to the first standby mode at step S203. The printing apparatus is shifted to the second standby mode where the printing apparatus can be actuated in a shorter time than that of the first standby mode at step S205. Thus, the sequence is finished.

Thus, the control unit determines to which of the first standby mode and the second standby mode the printing apparatus should be shifted based on the difference between the time of the instruction to turn off the printing apparatus and the next start time set with the setting unit, and performs control so that the printing apparatus is shifted to the determined mode. If the printing apparatus is shifted to the first standby mode when the non-operation time of the printing apparatus is short, the initialization is not finished before the next start time so that the user should wait a long time. In the present embodiment, the printing apparatus is shifted to the second standby mode, which is a light sleep state, when the non-operation time of the printing apparatus is short. Therefore, the initialization is finished and/or almost finished before the next start time, which reduces the waiting time of the user.

Figure 8:
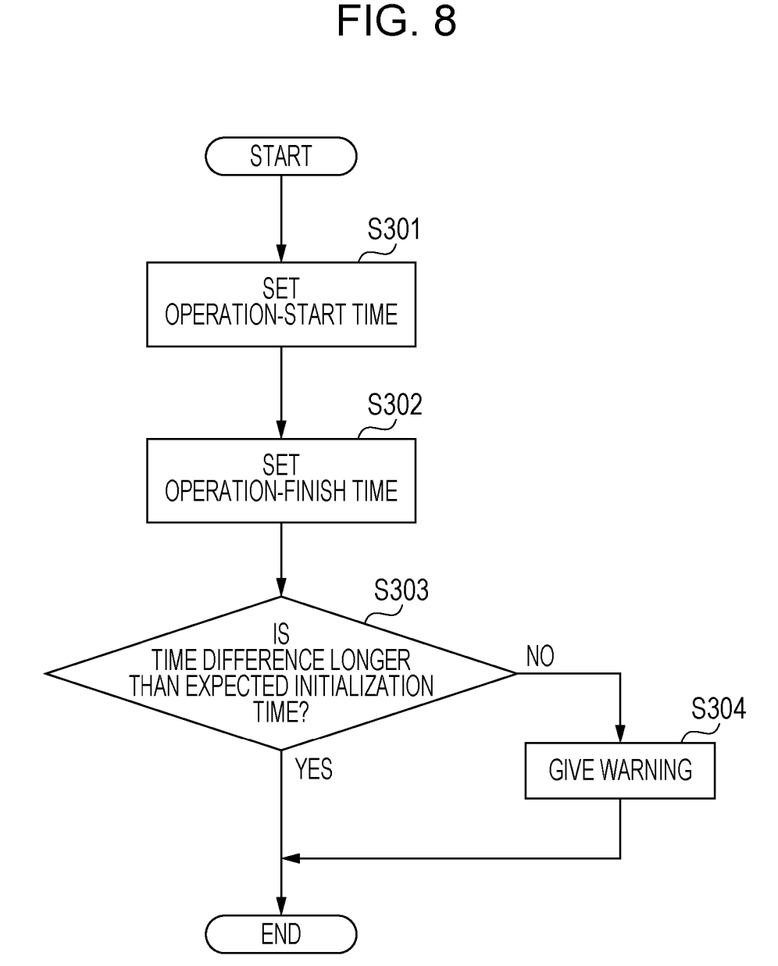
FIG. 8 is a flowchart illustrating a sequence performed to set the time when the use of the printing apparatus is started and the time when the use of the printing apparatus is finished.
Figure 9:
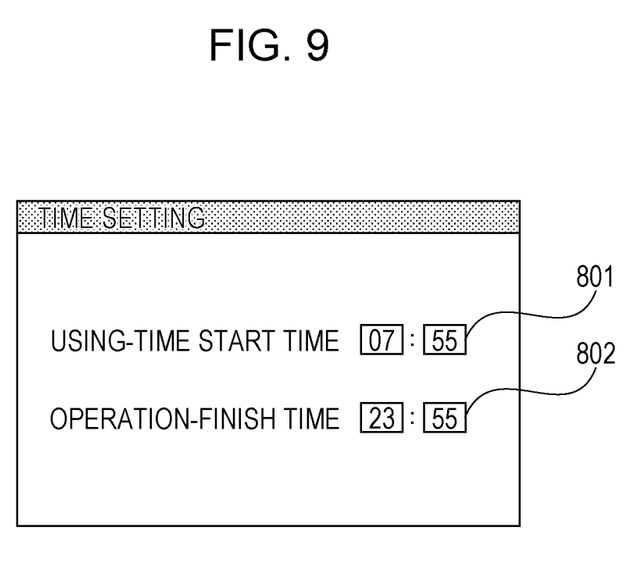
FIG. 9 illustrates an exemplary time-setting screen image.

FIG. 8 is a flowchart illustrating a sequence performed by the user setting the time to start using the printing apparatus and the time to finish using the printing apparatus. FIG. 9 illustrates an exemplary screen image used to set the time shown on the display of the operation unit 15 (the setting unit). In FIG. 8, the user operates the operation unit 15 during operation of the printing apparatus, so as to set the next start time with an input part 801 illustrated in FIG. 9 at step S301. The user sets the time when the current operation is finished with an input part 802 illustrated in FIG. 9 at step S302. The difference between the operation finish time and the time when the user starts using the printing apparatus is calculated and obtained at step S303.

It is determined whether or not the obtained time difference (the non-operation time of the printing apparatus) is longer than a specified time, where the specified time is an estimated time for initializing the printing apparatus when the printing apparatus returns from the first standby mode 402 in the present embodiment, the estimated time being obtained with the estimation unit. When the time difference is longer than the specified time, the answer is YES at step S303. Otherwise, the answer is NO at step S303. When the answer is YES, the sequence is finished. When the answer is NO, the processing advances to step S304 where a warning that the printing apparatus is turned off in the second standby state is shown on the display of the operation unit 15. When the time difference (the non-operation time of the printing apparatus) between the operation finish time and the time when the user starts using the printing apparatus, which are set with the user, is shorter than the time taken for turning off the printing apparatus (a specified time shorter than the estimated time), the settings that are made with the user are invalidated and/or not accepted. Then, a warning about the invalidation and the non-acceptance is shown on the display. Thus, the sequence is finished.

According to the above-described embodiments, it is determined to which of the first standby mode and the second standby mode the printing apparatus should be shifted based on the difference between the time of the instruction to turn off the printing apparatus and the time when the user starts using the printing apparatus. Further, the printing apparatus is automatically actuated and starts performing the initialization operations before the time when the user starts using the printing apparatus. Accordingly, the user can start using the printing apparatus without waiting a long time. That is, a convenient printing apparatus is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-042335 filed on Feb. 26, 2010, which is hereby incorporated by reference herein in its entirety.

What is claimed is:

1. An apparatus for controlling a printing unit, the apparatus comprising:
   a setting unit configured to set a next operation-start time that represents a future time at which the printing unit is entered into an operation state from a non-operation state, wherein a current operation-finish time represents a time at which the printing unit enters into the non-operation state from the operation state, and wherein the current operation-finish time is before the next operation-start time; and
   a control unit configured to cause the printing unit to enter into the non-operation state from the operation state, wherein the non-operation state includes at least a first standby mode and a second standby mode, wherein the printing unit is configured to be actuated from the first standby mode to the operation state in a first actuation time and actuated from the second standby mode to the operation state in a second actuation time that is shorter than the first actuation time,
   wherein, in response to determining that a time difference between the next operation start time and the current operation-finish time is shorter than a specified period corresponding to the first actuation time, the control unit restricts the printing unit to enter from the operation state into the non-operation state in the first standby mode.

2. The apparatus according to claim 1, wherein, in response to determining that the time difference is equal to or longer than the specified period, the control unit causes the printing unit to enter from the operation state into the non-operation state in the first standby mode, and
   wherein, in response to determining that the time difference is shorter than the specified period, the control unit causes the printing unit to enter from the operation state into the non-operation state in the second standby mode.

3. The apparatus according to claim 1, wherein the specified period is set based on a time taken for performing an initialization operation of the printing unit under the non-operation state in the first standby mode.

4. The apparatus according to claim 1, wherein, in response to determining that the time difference is shorter than the specified period, the setting unit gives a warning.

5. The apparatus according to claim 4, wherein, in response to determining that the time difference is shorter than a time taken to turn off the printing unit, the control unit gives a warning and either does not accept the setting of the next operation-start time or invalidates the setting of the next operation-start time.

6. The apparatus according to claim 1, wherein the current operation-finish time is at least one of a time, set by the setting unit, that represents a future time at which the printing unit enters into the non-operation state from the operation state, and a time at which a user issues an instruction to turn off the apparatus during operation of the printing unit.

7. The apparatus according to claim 1, wherein the control unit performs control to automatically actuate the printing unit from the non-operation state to the operation state through an initialization operation of the printing unit in advance of the set next operation-start time.

8. The apparatus according to claim 7, wherein the printing unit includes a drying unit configured to dry a sheet printed with the printing unit, and the specified period is set based on a period taken until the drying unit enters into a steady state and a period taken for performing adjustment of the printing unit, at least, wherein the adjustment of the printing unit is performed after the drying unit enters into the steady state.

9. The apparatus according to claim 7, wherein the printing unit includes a humidifying unit configured to generate a humidified gas supplied to the printing unit, and the specified period is set based on a period taken until the humidifying unit enters into a steady state and a period taken for performing adjustment of the printing unit, at least, wherein the adjustment of the printing unit is performed after the drying unit enters into the steady state.

10. The apparatus according to claim 1, wherein the printing unit performs printing with an inkjet system.

11. A method for an apparatus to control a printing unit, the method comprising:
    setting a next operation-start time that represents a future time at which the printing unit enters into an operation state from a non-operation state, wherein a current operation-finish time represents a time at which the printing unit is entered into the non-operation state from the operation state, and wherein the current operation-finish time is before the next operation-start time; and
    causing the printing unit to enter into the non-operation state from the operation state, wherein the non-operation state includes at least a first standby mode and a second standby mode, wherein the printing unit is configured to be actuated from the first standby mode to the operation state in a first actuation time and actuated from the second standby mode to the operation state in a second actuation time that is shorter than the first actuation time,
    wherein, in response to determining that a time difference between the next operation-start time and the current operation-finish time is shorter than a specified period, causing includes causing the printing unit to enter from the operation state into a non-operation state that is other than the first standby mode.

12. The method according to claim 11, wherein controlling includes controlling to automatically actuate the printing unit from the non-operation state to the operation state through an initialization operation of the printing unit in advance of the set next operation-start time.

* * * * *